United States Patent
Rodriguez et al.

(10) Patent No.: US 7,039,440 B2
(45) Date of Patent: May 2, 2006

(54) WIRELESS RECHARGEABLE MONEY CARD

(75) Inventors: Herman Rodriguez, Austin, TX (US); Newton James Smith, Jr., Austin, TX (US); Clifford Jay Spinac, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 236 days.

(21) Appl. No.: 10/718,300

(22) Filed: Nov. 20, 2003

(65) Prior Publication Data

US 2005/0113137 A1 May 26, 2005

(51) Int. Cl.
*H04M 1/00* (2006.01)

(52) U.S. Cl. ............ 455/558; 455/41.2; 455/557; 379/114.16; 379/114.17; 705/8; 705/52

(58) Field of Classification Search ............. 455/558, 455/41.2, 557; 705/8, 52; 379/114.16, 114.17
See application file for complete search history.

(56) References Cited

U.S. PATENT DOCUMENTS

| | | | |
|---|---|---|---|
| 5,326,960 A | 7/1994 | Tannenbaum | |
| 5,350,906 A | 9/1994 | Brody et al. | |
| 5,528,222 A | 6/1996 | Moskowitz | |
| 5,682,143 A | 10/1997 | Brady et al. | |
| 5,786,626 A | 7/1998 | Brady et al. | |
| 6,250,557 B1 | 6/2001 | Forslund et al. | |
| 6,334,159 B1 * | 12/2001 | Haupt | 710/6 |
| 6,442,532 B1 | 8/2002 | Kawan | |
| 6,466,007 B1 | 10/2002 | Prazeres da Costa et al. | |
| 6,480,710 B1 | 11/2002 | Laybourn et al. | |
| 6,572,015 B1 | 6/2003 | Norton | |
| 2002/0187779 A1 * | 12/2002 | Freeny, Jr. | 455/422 |
| 2003/0014186 A1 | 1/2003 | Adams, Jr. et al. | |
| 2003/0028481 A1 | 2/2003 | Flitcroft et al. | |
| 2003/0163384 A1 | 8/2003 | Hendra | |
| 2003/0172028 A1 | 9/2003 | Abell et al. | |
| 2004/0110515 A1 * | 6/2004 | Blumberg et al. | 455/456.1 |
| 2004/0162058 A1 * | 8/2004 | Mottes | 455/411 |
| 2004/0185827 A1 * | 9/2004 | Parks | 455/406 |
| 2005/0027543 A1 * | 2/2005 | Labrou et al. | 705/1 |

* cited by examiner

*Primary Examiner*—Danh Cong Le
(74) *Attorney, Agent, or Firm*—Mark S. Walker; Streets & Steele; Jeffrey L. Streets (57) ABSTRACT

A method, computer program product and system that may be used to limit the funds that are available through the use of a business transaction card by having a business transaction card first place a request for an increase of the available funds. A wireless device is sensed within a proximity to a terminal that supports wireless communication and communication between the wireless device and the terminal is established for transferring an identification code from the wireless device to the terminal. The terminal is communicatively connected to a server and the terminal automatically transfers the identification code from the terminal to the server. The server matches the identification code with an account number of the business transaction card and, if authorization exists, automatically increases the funds available balance of the business transaction card.

54 Claims, 4 Drawing Sheets

WIRELESS RECHARGEABLE MONEY CARD

BACKGROUND OF THE INVENTION

1. Field of the Invention

The present invention relates to wireless communication, and more particularly to methods and systems for using wireless communication to authorize a new available funds balance for business transaction cards, such as debit and credit cards.

2. Description of the Related Art

In recent years there has been a consistent trend of moving to a "cashless society." One aspect of that trend may be seen in the steady increase in the use of personal transaction cards used to authorize or facilitate various financial transactions. For example, cards that are widely used for conducting business transactions, and especially consumer business transactions, include credit cards, debit cards, cash cards, value cards and bank cards. With technological advances, the features of these cards are ever changing and card classifications and definitions are therefore somewhat ambiguous and fluid.

Smart cards are "credit card" sized cards that contain electronics and are well known in the art as being useful for identification cards, access cards, credit cards and other business transaction cards. Smart cards are now readily available to many consumers for use in a variety of ways. Some smart cards include a microprocessor and a memory and others are simply memory cards with hardwired logic. Smart cards may be battery operated or they may operate without a battery. U.S. Pat. No. 6,572,015, issued to Norton, discloses a smart card having wireless communication capability and is hereby incorporated fully by reference.

Smart cards that communicate wirelessly with smart card readers may communicate with a card reader using one of several known communication protocols. One popular wireless communication protocol is Bluetooth, which provides a specification for short distance wireless radio frequency (RF) communication applications. Bluetooth operates in a multi-user environment to allow wireless communication between wireless communication devices within a specific radius of each other. An example of a wireless smart card utilizing Bluetooth technology may be found in the U.S. Patent Publication No. 2003-0172028 of Abell, et al., which is hereby fully incorporated by reference. Abell discloses a Bluetooth enabled smart card that is used to communicate with a merchant's billing system so that a customer's bill, such as a restaurant check, may be charged to the smart card. One benefit of this disclosed method is that the customer does not have to wait for a server to return with the customer's credit card, charge slip or change.

While the advancing technology and other aspects of the cashless society have simplified consumer transactions, the trend towards the cashless society has not eliminated all consumer transaction concerns. One concern is the use of credit cards and debit cards by unauthorized individuals. Another concern is the ease with which these cards may be used by authorized individuals. Consumers are often exposed to advertisements and glittering store displays that tempt consumers to make spontaneous purchases. Consumers charge large sums of money to their credit cards and many carry very high credit card balances. Before the trend to the cashless society, consumers went to the store with a fixed amount of cash in their possession and, when that cash was spent, no other purchases could be made until the consumer went to the bank to withdraw additional cash. By contrast, the only limit on the spending power of a consumer today is the consumer's credit limit on a credit card or the amount of cash that the consumer has in an account upon which a debit card draws.

Before the cashless society trend, parents could give their teenaged children a set amount of cash and send them to the store to buy, for example, their back-to-school clothes. Today, parents often send their teenage children to the mall for purchasing their back-to-school clothes with the credit cards or debit cards of the parents clutched in their teenagers' hands. Such trips to the mall often result in much higher expenditures than the parents originally envisioned.

Attempts have been made by others to limit the funds that are available to an individual through a credit or a debit card. For example, U.S. Patent Publication No. 2003-0028481 discloses a limited use credit card having a credit limit for each specific transaction or a credit limit such that when the aggregate amount of a series of transactions exceeds a specific credit limit, then the credit card number would be canceled or invalidated. The 2003-0028481 publication also discloses other restrictions that could be placed on a limited use card including, inter alia, limitations as to time period, frequency of use, geographical region, and merchant classification.

In other examples, U.S. Pat. No. 5,350,906 (Brody, et al.) and U.S. Pat. No. 5,326,960 (Tannenbaum, et al.) disclose methods for issuing temporary personal identification numbers (PINs) for one time or limited credit access to an account at an ATM. These patents disclose a currency transfer system and method for an ATM network. In this system, a sponsor account holder sets up a sub-account that may be accessed by a non-subscriber presenting a fixed-limit card associated with the sub-account and by entering a password corresponding to the sub-account. Once the fixed limit is reached, the card can no longer be used. The fixed-limit card is disclosed as containing information on a magnetic stripe that pertains to the sponsor account.

While others have recognized that consumers need a method and system that limits their access to their funds and thereby limits their susceptibility to vendors' efforts to encourage spontaneous purchases, there is currently no method or system that allows a consumer to easily control access to available credit or funds and thereby limit or control spending on spontaneous purchases. It would be advantageous if such a method and system further decreased the risk of fraudulent use of a business transaction card or minimized the dangers associated with conducting personal banking at, for example, and ATM.

The foregoing and other objects, features and advantages of the invention will be apparent from the following more particular description of a preferred embodiment of the invention, as illustrated in the accompanying drawings wherein like reference numbers represent like parts of the invention.

SUMMARY OF THE INVENTION

The present invention provides a method, computer program product and system that may be used to limit the funds available balance of a business transaction card, such as a credit card, debit card, bank card, value card or cash card. One embodiment of the method includes sensing a wireless device within a proximity to a terminal that supports wireless communication and establishing communication between the wireless device and the terminal. The wireless communication between the wireless device and the terminal may be any communication protocol including, for example, Bluetooth or WiFi. The proximity to the terminal is defined by being within the wireless communication coverage area of the terminal and may between about 0.1 foot and about 300 feet from the terminal, although other ranges are equally acceptable. The terminal is further communicatively connected to a server of, for example, the financial institution that issued the business transaction card and the terminal automatically transfers the identification code from the terminal to the server. The server matches the identification code with an account identification or an account number of the business transaction card and, if authorization exists, automatically increases the funds available balance of the business transaction card.

The wireless device may be a smart card or the wireless device may be selected from, for example, a mobile telephone, a personal digital assistant and a personal computer. The terminal may be located within an ATM because of the convenience of ATM locations and because the ATM is already communicatively connected to the financial institutions normally associated with business transaction cards. However, the terminal may be located within other support or protective structures and located within or near a bank, a credit union, a business establishment, a retail establishment and combinations thereof.

The method further includes accessing account information stored on the server in a database, wherein the account information is associated with the account identification of the business transaction card. The account information includes pertinent information about the account and may comprise, for example, the identification code, the account identification, paid transactions, a funds available balance, an authorized debit card user, an account owner, and the authorized incremental funds amount.

Furthermore, the method of a preferred embodiment includes comparing the authorized incremental funds amount and a funds available balance contained in the account information; determining if the funds available balance is less than the authorized incremental funds amount; and determining if an authorization exists to increase the funds available balance. If the authorization exists to increase the funds available balance, then an increase is made in the funds available balance by an amount selected from the amount that increases the funds available balance to the authorized incremental funds amount and the amount that increases the funds available balance by the authorized incremental funds amount.

If, however, the authorization does not exist to increase the funds available balance, then the method includes refusing to automatically increase the available funds balance and sending a message that an increase to the available funds balance was refused, wherein the message is delivered to a device selected from a mobile telephone, a personal computer, a personal digital assistant, a smart card or combinations thereof.

Optionally, after the funds available balance has been automatically increased, the method further includes sending a message that the available funds balance was increased, wherein the message is delivered to a device selected from a mobile telephone, a personal computer, a personal digital assistant, a smart card or combinations thereof.

The account user may input authorization instructions to the server using, for example, a personal computer having a browser that is connected to the server through the Internet. Therefore, a preferred embodiment of the invention further includes receiving the authorized incremental funds amount as an input and storing the spending limit value in the database. Other limitations may be included as instructions from the account user including limitations for use of the business transaction card, wherein the limitations are selected from geographical use, time period of use, time of day, and merchant classification. Limitations may further include limiting the number of times a day, week or month that the wireless device may be presented for increasing the available funds balance and limiting the total money amounts that are spent or added to the available funds balance for a day, week or month. The server receives authorization instructions from the account user and stores these instructions in the database. Authorization instructions may include, for example, a terminal location to receive the wireless communication, a time to receive the wireless communication and combinations thereof. Setting a time, date or location of a terminal that will communicate with a wireless device provides further security against unauthorized use of the business transaction card.

DETAILED DESCRIPTION

The present invention provides a method, computer program product and system that may be used to control the availability of funds or to limit the funds that are available through the use of a debit card, a credit card or other business transaction card. The method limits the "available funds balance" of a business transaction card by requiring that the user place a request for an increase of the available funds balance by placing a wireless device proximate to a terminal that supports wireless communication. In one preferred embodiment of the invention, the wireless device is a smart card.

By placing the wireless device proximate to the terminal, a request to increase the funds available balance is automatically generated through wireless communication between the wireless device and the terminal. If the wireless device is not placed proximate to the terminal, the funds available balance is not increased, thereby limiting the funds available balance of the business transaction card to a previously set amount. Therefore, while a business transaction card may be associated with a credit card account having a high available credit balance or with a checking or savings account having a high balance, the business transaction card is authorized to access only the authorized funds available balance, which may be automatically increased only upon placing a wireless device proximate to the terminal.

One embodiment of the method includes sensing the wireless device within the wireless communication coverage area of the terminal so that wireless communication between the wireless device and the terminal can be established. The wireless device is sensed only proximate to the terminal because the wireless communication coverage area of the terminal is limited to an area proximate to the terminal. When the wireless device is placed within the communication coverage area of the terminal, wireless communication is established between the wireless device and the terminal so that information, including an identification code that is stored in the memory of the wireless device, may be read by the terminal.

The terminal is communicatively connected to a server belonging, for example, to a financial institution that issued the business transaction card. A database stored on the server contains account information pertinent to the account or accounts that are associated with the business transaction card. By matching the identification code, read by the terminal from the wireless device, with an account identification or account number, the server determines which account is associated with the business transaction card requesting an increase in the available funds balance. The database contains all the account information pertinent to the account and such account information may be selected from, for example, the identification code from the wireless device, an account number or other account identification, paid transactions, an available funds balance, authorized business transaction card users, an account owner and address, an authorized increased funds amount, credit available, checking account balance, savings account balance, authorization information, and combinations thereof.

After the server has accessed the account information associated with the identification code read by the terminal from the wireless device, the server determines whether an increase in the available funds balance is authorized. If an increase of the funds available balance of the transaction card is authorized, the server may notify the user that the available funds balance of the transaction card was increased to an authorized level by automatically sending a confirmation notice by, for example, email, fax, or telephone.

When a business transaction card user decides to request an increase in the funds available balance on the business transaction card, the user must carry a wireless device to a terminal location that supports wireless communication. Preferably, the communications between the wireless device and the terminal are secured. In one embodiment, the communication may be encrypted using, for example, a private key that represents the user's account password. A preferred terminal is an automated teller machine (ATM) that supports wireless communication by being equipped with a reader capable of communicating with the wireless device. However, the terminal may be placed within many other different devices so long as the terminal is provided with the protection and the connections (i.e., power connections and information network connections) that the terminal requires for operation. Desired terminal locations may include, for example, the ATM, a bank, a credit union, an office building, a retail establishment, and other business establishments.

The wireless device having a memory that contains the identification code may be selected from, for example, a wireless telephone, a personal digital assistant, a personal computer, or a smart card. These wireless devices may use, for example, Bluetooth or WiFi wireless communication protocol to communicate with the terminal. Bluetooth is a preferred communication protocol for a smart card because the power demands of a Bluetooth device are relatively small. Another preferred wireless communication protocol for a smart card includes radio frequency identification tags (RFID), which operate with no battery within the smart card. A chip contained within the smart card is stimulated by signals that are broadcast by the terminal, causing the chip to broadcast return information from the chip back to the terminal in a form that the terminal can read. These wireless communication protocols and methods are merely examples of protocols and methods that are well known to those having ordinary skill in the art and as such, do not form a part of the present invention nor is the present invention meant to be limited only to these exemplary protocols.

The wireless device includes a memory that contains information that is wirelessly communicated to the terminal. The information includes the identification code that may include numbers and/or letters. Other information that may be stored in the memory of the wireless device and communicated to the terminal may include, for example, the name and address of the wireless device owner, the name and address of the financial institution issuing the card and combinations thereof.

After the terminal has established communication with the wireless device and read the identification code, the terminal communicates the code to a server belonging to a financial institution. The terminal is communicatively connected to the server through, for example, a wide area network such as the Internet, through a local area network, through a telephone system, through a microwave communication system or combinations thereof. The server accesses information concerning the account of the user based upon the identification code that was communicated from the wireless device to the terminal.

After accessing the account information associated with the business transaction card, the server compares the authorized incremental funds amount of the transaction card with the funds available balance. The authorized incremental funds amount is an authorized amount by which or to which the funds available balance may be increased. One benefit of a preferred embodiment of the method is that the business transaction card user may be limited to spending only an amount of money equal to the authorized incremental funds amount without first having to return to a terminal and place the wireless device proximate to the terminal to request another increase in the funds available balance, if authorization for another increase exists. This reduces the susceptibility of the business transaction card user to make spontaneous purchases. Other benefits of the present invention include minimizing losses from the fraudulent use of the business transaction card by another. Losses are limited to the funds available balance, not the funds available from a user's bank account as may be the case with, for example, a typical debit card. Another benefit of the present invention is an increase in safety. If an increase in the available funds balance is desired, the method provides that the user need only drive by a terminal, such as an ATM configured for the present invention, to increase the available funds balance, there being no need to exit the safety of the user's car.

Authorization for increasing the available funds balance by or to an amount equal to the spending limit is made by an account owner or other authorized user. Authorization is achieved by the authorized account user setting the amount of the spending limit along with any additional limitations. Setting the amount of the spending limit and any other authorization criteria may be accomplished through an Internet connection between, for example, a personal computer having a browser and the server. Using the browser, the authorized account user may set the spending limit or may set different spending limits subject to defined constraints. For example, the authorized account user may decide to authorize any increases in the spending limit to only a set number of times over a given period. Alternatively, different amounts of a spending limit may be set as a function of the number of increases granted over a period of time. Other limitations may include, for example, geographical limitations, time period limitations, frequency of use limitations and classification of merchant limitations. Information concerning these limitations is stored in the database with the other account information.

Optionally, the authorized user may set authorization instructions that limit authorizations based upon a particular date, time and/or location for the wireless communication to take place between the wireless device and the terminal. For example, the authorized account user may specify that only requests from a wireless device communicated to a particular terminal on a particular date and time may be considered for increasing the spending limit on the business transaction card.

Figure 1:
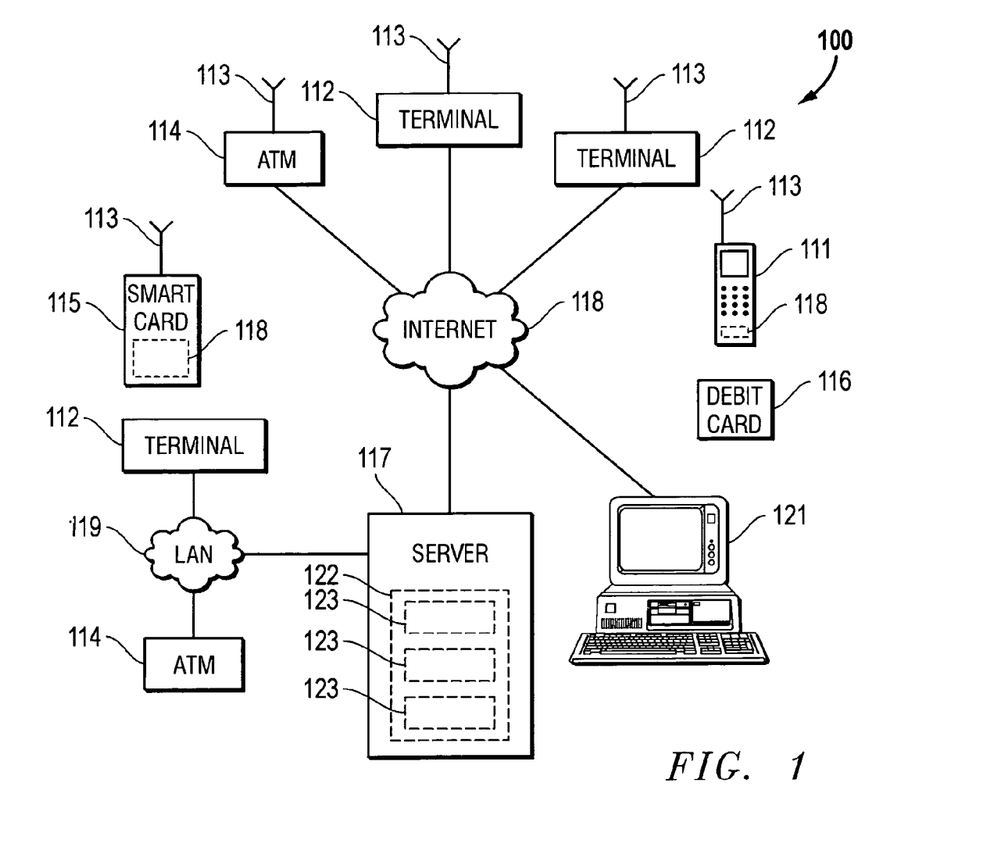
FIG. 1 is a schematic diagram of a system that may be used to implement the present invention.

FIG. 1 is a schematic diagram of an exemplary system that may be used to implement the present invention. Terminals 112 are connected to a wide area network, such as the Internet 118. ATMs 114 are also shown connected to the Internet 118, but is should be recognized that ATMs are merely convenient containers for holding a terminal and therefore comprise many other parts that are not part of the terminal. Alternatively, the terminals 112 and ATMs 114 may be connected to a local area network 119. Each of the terminals 112 support wireless communication and have an antenna 113 through which wireless communication may be established. A smart card 115 or other wireless device, such as a mobile telephone 111, is capable of wireless communication with the terminals 112 and ATMs 114. When a business transaction card user places the smart card 115 or the mobile telephone 111 proximate to one of the terminals 112 or ATMs 114, the terminal establishes wireless communication with the smart card 115 or the mobile telephone 111 and reads the account identification code 118 that is stored in the memory of the smart card 115 or the mobile telephone 111.

The terminals 112 and ATMs 114 are communicatively linked to a server 117. The terminals 112 and ATMs 114 may be linked to the server 117 through the wide area network, such as the Internet 118, or through a local area network 119. The networks 118, 119 may include permanent connections, such as wire or fiber optic cables, or temporary connections made through telephones or wireless communications. Personal computers 121 and servers 117 may be represented by a variety of computing devices, such as mainframes, personal computers, personal digital assistants (PDA's), and Internet-connected cellular telephones. The networks 118, 119 may include additional servers, routers and other devices not shown. The Internet 118 represents a worldwide collection of networks and gateways that use the TCP/IP suite of protocols to communicate with one another. Of course, the networks 118, 119 may also include a number of different types of networks, such as, for example, an intranet, a local area network (LAN), or a wide area network (WAN).

According to one embodiment of the present invention, a business transaction card user may place a smart card 115 within the proximity of a terminal 112. The proximity of the terminal 112 is set by the wireless communication coverage area of the terminal 112. This proximity may be between about 0.1 foot and about 300 feet from the terminal. Preferably, the proximity may be between about 1 foot and about 50 feet or even of between about 4 feet and about 10 feet from the terminal. Alternatively, a user may bring the mobile telephone 111 into the proximity of a terminal 112. In this embodiment, the mobile telephone 111 provides the wireless communication necessary for automatically increasing the funds available balance on a business transaction card 116 that is not a smart card. It should be noticed that the present invention may be practiced with many different wireless devices and is not limited to using smart cards as business transaction cards.

Once the business transaction card user places the smart card 115 proximate to the terminal 112, wireless communication is established between the smart card 115 and the terminal 112, enabling the terminal 112 to read the account identification code 118 embedded on the memory of the smart card 115. The terminal 112 communicates the account identification code 118 to a financial institution's server 117 through the internet 118 or the LAN 119. A database 122 stored on a computer readable memory within the server 117 includes account information 123 for the accounts of the financial institution. The account information 123 includes, for example, the account identification code 118 cross referenced with the account identification, the owner of the account, paid transactions, cross references to other accounts, the funds available balance, authorized debit card users, the account authorized incremental funds amount and combinations thereof.

A personal computer 121 may communicate with the server 117 over the Internet 118. The account owner or other authorized account user may provide the authorization instructions to the server 117 through the personal computer 121. The authorization instructions are stored on the database 122 with the account information 123.

Figure 2:
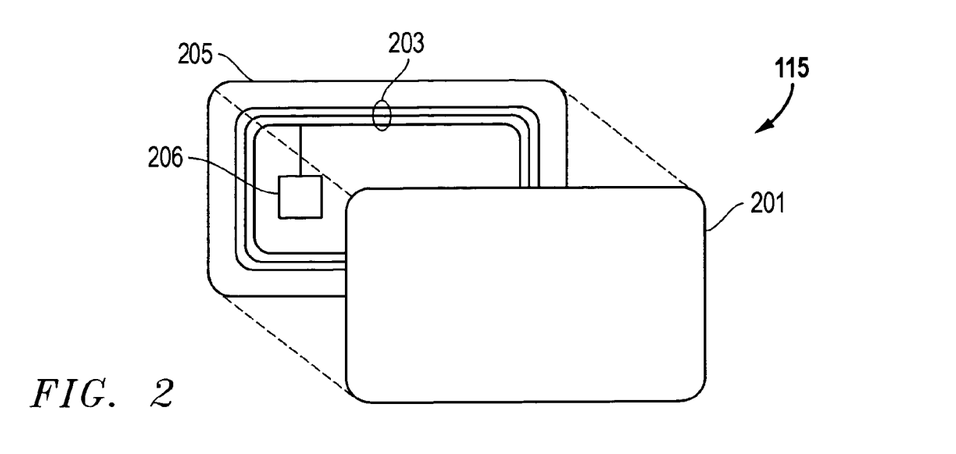
FIG. 2 illustrates an embodiment of a smart card that may be used in accordance with the present invention.

FIG. 2 illustrates an embodiment of a smart card that may be used in accordance with the present invention. The smart card 115 is one embodiment of a passive radio frequency (RF) enabled smart card that can operate without a battery. The body of the smart card 115 includes a front portion 201 and a rear portion 205 and embedded therebetween are an antenna 203 (or coil) and an integrated circuit 206. The antenna 203 can be formed using three to five turns of very thin commercially available wire, for example, or it can be formed using conductive ink. The antenna 203 is connected to an integrated circuit chip 206. Both the terminal 112 (FIG. 1) and the smart card 115 have an antenna 203, 113 that is tuned to the same frequency to form a wireless communication link. The smart card 115 as is well known to those having ordinary skill in the art. Alternatively, smart cards may include a battery to provide power as known to those having ordinary skill in the art.

The front and rear portions 201, 205 of the smart card 115 are laminated so as to form a single unit and serve to sandwich the antenna 203 and the integrated circuit 206 therebetween. The body of the smart card is generally formed from plastic, such as acrylonitrile butadiene styrene (ABS) and polyvinyl chloride (PVC). The front portion 201 of the smart card 115 is generally prepared for receiving personalization indicia and graphics. The rear portion 205 of the smart card 115, while it can receive indicia, is generally reserved for a magnetic stripe if desired.

The integrated circuit 206 sandwiched within the smart card 115 may be manufactured using Very Large Scale Integration (VLSI), whereby several thousand transistors are combined on a single silicon substrate having a relatively small surface area of about a few square millimeters. All the circuit components of the integrated circuit 206 must fit within these relatively small confines. For example, in one embodiment, the integrated circuit 206 should not exceed about 25 square mm. One reason for the size limitation is that the integrated circuit 206 is made from silicon having the consistency and fracture characteristics of glass and is particularly easy to break. Accordingly, it is desirable for the size of the integrated circuit 206 to be limited to only about a few square millimeters in order to accommodate the inevitable flexure that the smart card 115 may encounter while in use.

Figure 3:
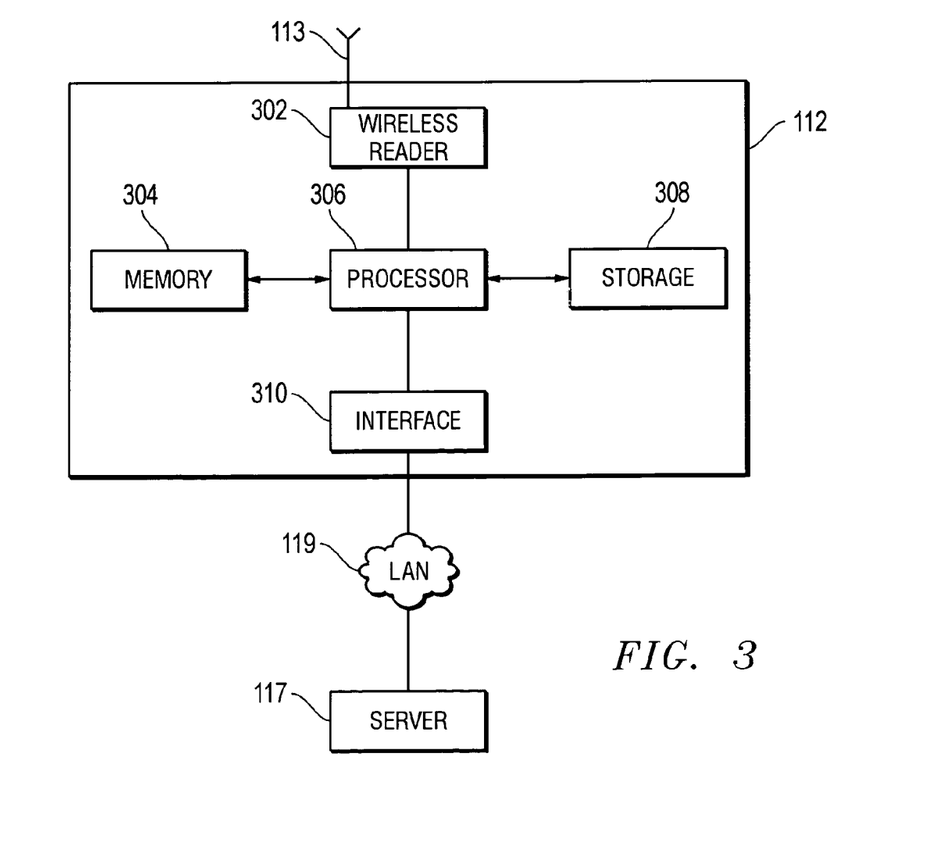
FIG. 3 illustrates an embodiment of a terminal that may be used in accordance with the present invention.

FIG. 3 illustrates an embodiment of a terminal that may be used in accordance with the present invention. The terminal 112 supports wireless communication through an antenna 113 that receives and transmits radio frequency signals to communicate with, for example, a smart card 115 (FIG. 1). The terminal 112 further includes a wireless reader 302, a processor 306 in communication with the wireless card reader. 302, a storage 308 in communication with the processor 306, and an interface 310 in communication with the processor 306 and the local area network (LAN) 119. The wireless reader 302 can be any wireless reader known to those having ordinary skill in the art without departing from the scope of the present invention. After reading the identification code from a wireless device such as the smart card, the processor 306 receives the identification code and interacts with memory 304 and may access the storage 308 to confirm that the smart card is a wireless device that is eligible to be processed according to the method of the present invention. Contact addresses for various financial institutions, encoding algorithms and procedures for encoding communications with the financial institutions, and other instructions may be stored in storage 308 until needed by the processor 306. After determining the correct financial institution to contact, the processor 306 directs the identification code of the smart card to the server 117 located on the LAN 119.

Figure 4A:
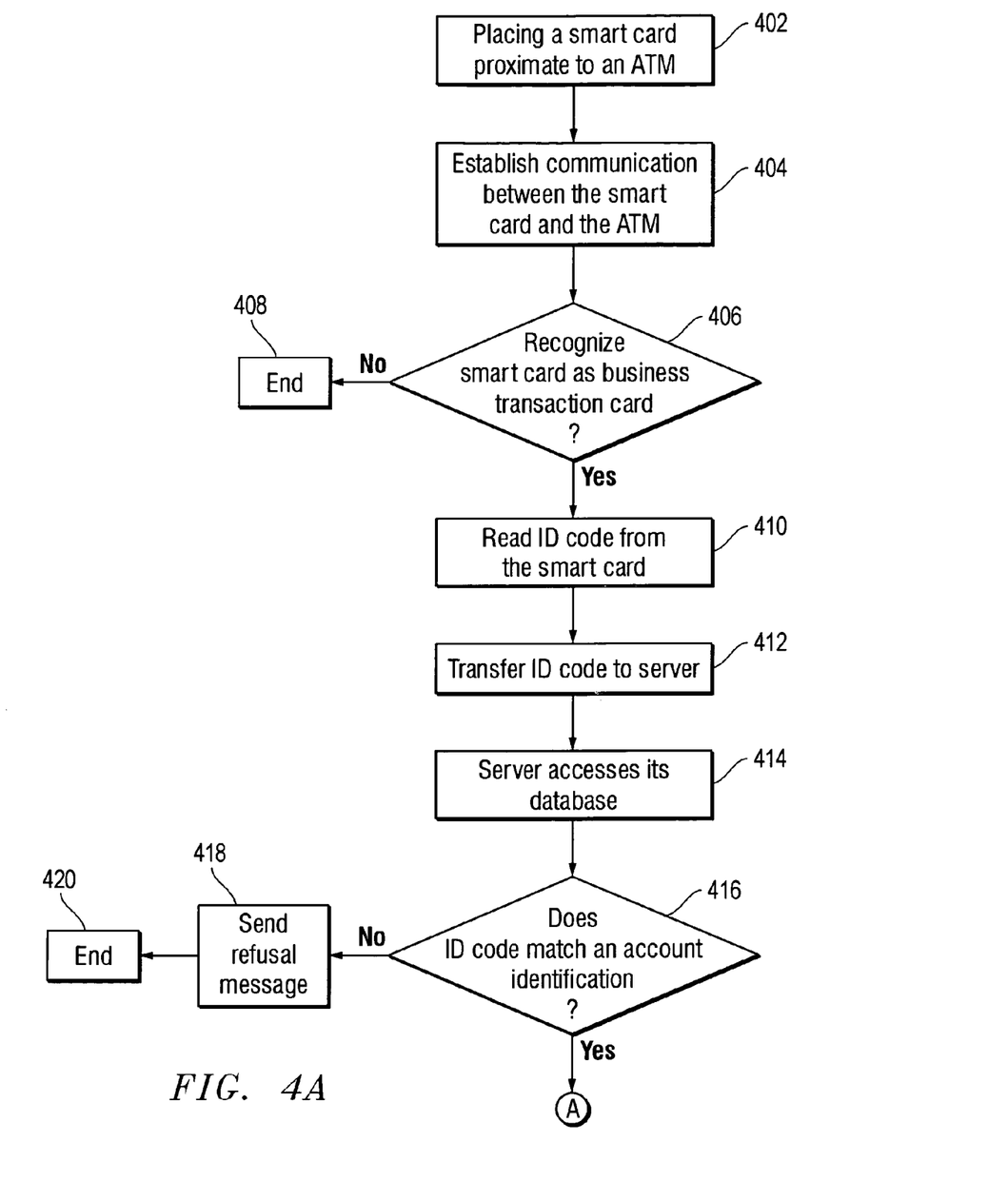
FIGS. 4A–4B is a flow chart of a method that may be executed on the system of FIG. 1.
Figure 4B:
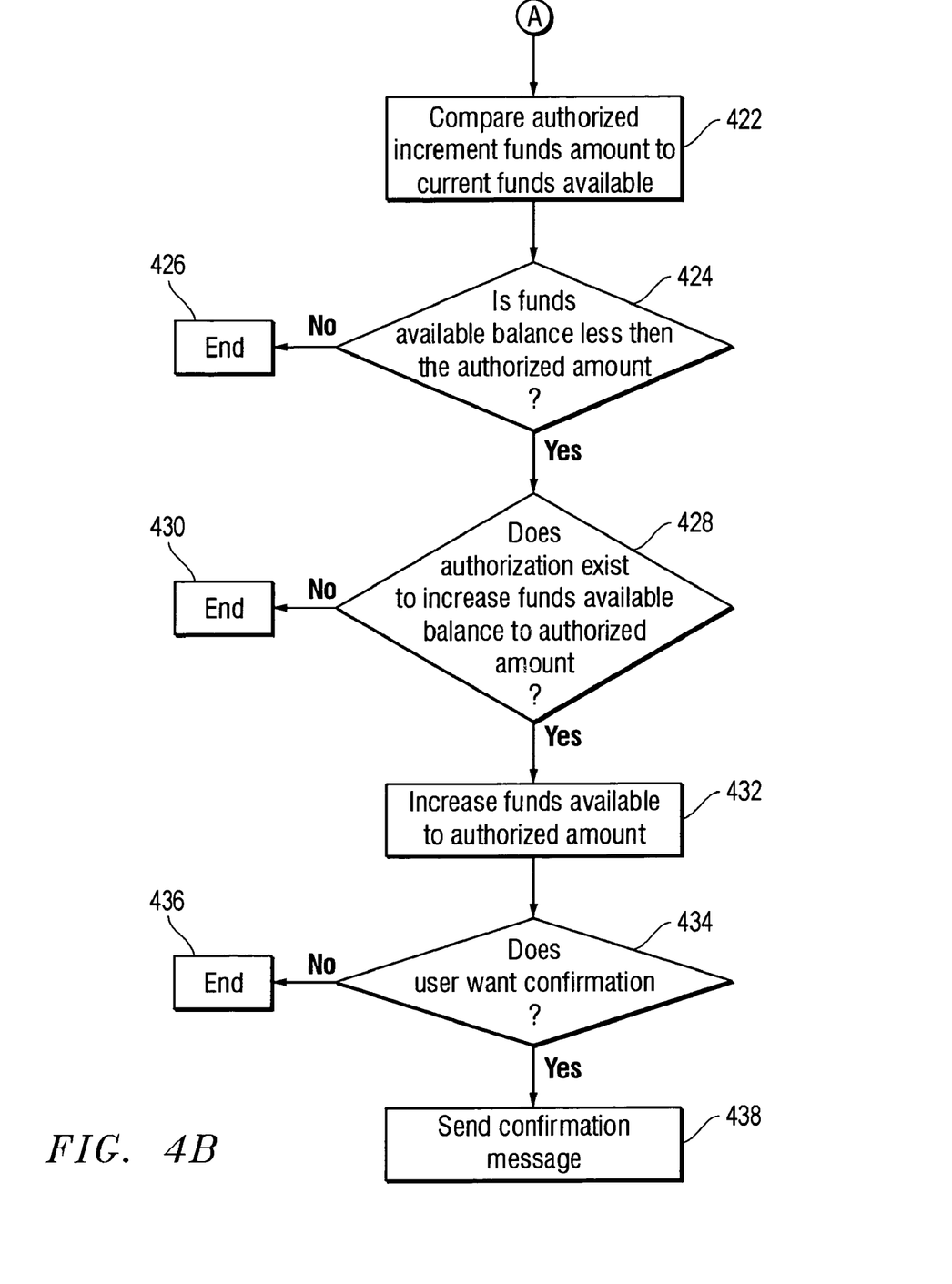

FIGS. 4A–4B present a flow chart of a method that may be executed on the system illustrated in FIG. 1. In state 402, a user places a smart card proximate to an ATM that supports wireless communication. In state 404, wireless communication is established between the smart card and the ATM. In state 406, the ATM determines whether the smart card is a business transaction card. If, in state 406, the ATM does not recognize the smart card as a business transaction card, then in state 408, the method ends. If, in state 406, the ATM recognizes the smart card as a business transaction card, then in state 410, the ATM reads the identification code that is stored on the memory of the smart card. In state 412, the ATM transfers the identification code to the server where, in state 414, the server accesses its database. In state 416, the server tries to match the identification code with an account identification. If, in state 416, the server cannot match the identification code with an account identification, then in state 418, the server sends a refusal message to the ATM and in state 420, the method ends. If, in state 416, the server matches the identification code with an account identification, then in state 422, the server compares the authorized incremental funds amount of the account with the current funds available balance. If, in state 424, the server determines that the funds available balance is not less than the authorized incremental funds amount, then in state 426, the method ends. Alternatively, a message may be sent to the user, by email, fax, or by a wireless device, that the funds available balance was not less than the authorized incremental funds amount and therefore, the funds available balance was not increased. If, in state 424, the server determines that the funds available balance is less than the authorized incremental funds amount, then in state 428, the server determines whether authorization exists to increase the funds available balance up to the authorized amount. If, in state 428, authorization does not exist to increase the funds available balance up to the authorized incremental funds amount, then in state 430, the method ends. If, in state 428, authorization does exist to increase the funds available balance, then in state 432, the server increases the funds available balance to the authorized incremental funds amount. This may be accomplished by transferring funds from another account or simply by making funds available that are in the account associated with the smart card. In state 434, the server checks the database to determine whether the user has requested confirmation. If, in state 434, there is no request for a confirmation message, then in state 436, the method ends. If, in state 434, there is a request for a confirmation message, then in state 438, a confirmation message is sent to the user.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. A method, comprising:
   sensing a wireless device within a proximity to a terminal that supports wireless communication, wherein the proximity is within a wireless communication coverage area of the terminal;
   establishing wireless communication between the wireless device and the terminal, wherein the terminal is communicatively connected to a server;
   transferring an identification code from the wireless device to the terminal;
   sending the identification code from the terminal to the server;
   matching the identification code with an account identity of a business transaction card;
   accessing account information stored on the server, wherein the account information is associated with the account identification of the business transaction card and comprises an authorized incremental funds amount and a funds available balance;
   comparing the authorized incremental funds amount and a finds available balance; and
   if authorized, increasing the funds available balance by an amount selected from the amount that increases the funds available balance to the authorized incremental funds amount or by the authorized incremental finds amount.

2. The method of claim 1, wherein the wireless device is a smart card.

3. The method of claim 2, wherein the smart card is the business transaction card.

4. The method of claim 1, wherein the business transaction card is selected from a credit card, a debit card, a bank card, a cash card, a value card or combinations thereof.

5. The method of claim 1, wherein the wireless device is selected from the group consisting of a mobile telephone, a personal digital assistant and a personal computer.

6. The method of claim 1, wherein the terminal is at a location selected from the group consisting of an ATM machine, a bank, a credit union, a business establishment, a retail establishment and combinations thereof.

7. The method of claim 1, wherein the proximity is between about 0.1 foot and about 300 feet from the terminal.

8. The method of claim 1, wherein the proximity is between about 1 foot and about 50 feet from the terminal.

9. The method of claim 1, wherein the proximity is between about 4 feet and about 10 feet from the terminal.

10. The method of claim 1, wherein the account information further comprises the identification code, the account identification, paid transactions, an authorized debit card user and an account owner.

11. The method of claim 1, further comprising:
determining if the funds available balance is less than the authorized incremental funds amount; and
determining if an authorization exits to increase the funds available balance.

12. The method of claim 11, wherein the authorization does not exist to increase the funds available balance, the method further comprises:
refusing to automatically increase the available funds balance; and
sending a message that an increase to the available funds balance was refused, wherein the message is delivered to a device selected from a mobile telephone, a personal computer, a personal digital assistant, a smart card or combinations thereof.

13. The method of claim 1, after the step of automatically increasing the available funds balance of the business transaction card, the method further comprises:
sending a message that the available funds balance was increased, wherein the message is delivered to a device selected from a mobile telephone, a personal computer, a personal digital assistant, a smart card or combinations thereof.

14. The method of claim 1, wherein the authorization code and the account identification comprises numbers, letters or combinations thereof.

15. The method of claim 1, wherein the wireless communication uses Bluetooth protocol.

16. The method of claim 1, wherein the wireless communication uses WiFi protocol.

17. The method of claim 1, wherein the wireless communication operates in a personal area network.

18. The method of claim 1, further comprising:
receiving the authorized incremental funds amount as an input; and
storing the authorized incremental fluids amount in a database.

19. The method of claim 1, further comprising:
receiving limitations for use of the business transaction card, wherein the limitations are selected from geographical use, time period of use, and merchant classification; and
storing the limitations for use of the business transaction card in a database.

20. The method of claim 1, further comprising:
receiving authorization instructions;
storing the authorization instructions in a database.

21. The method of claim 20, wherein the authorization instructions are selected from the group consisting of a terminal location to receive the wireless communication, a time to receive the wireless communication and combinations thereof.

22. The method of claim 1, further comprising:
encrypting the wireless communication.

23. A computer program product, comprising:
sensing instructions for sensing a wireless device within a proximity to a terminal that supports wireless communication, wherein the proximity is within a wireless communication coverage area of the terminal;
establishing instructions for establishing wireless communication between the wireless device and the terminal, wherein the terminal is communicatively connected to a server;
transferring instructions for automatically transferring an identification code from the wireless device to the terminal;
sending instructions for sending the identification code from the terminal to the server;
matching instructions for matching the identification code with an account identification of a business transaction card;
accessing instructions for accessing account information stored on the server, wherein the account information is associated with the account identification of the business transaction card and comprises an authorized incremental funds amount and a funds available balance;
comparing instructions for comparing the authorized incremental funds amount and a funds available balance; and
if authorized increasing instructions for automatically increasing the funds available balance by an amount selected from the amount that increases the funds available balance to the authorized incremental funds amount or by the authorized incremental funds amount.

24. The computer program product of claim 23, wherein the wireless device is a smart card.

25. The computer program product of claim 24, wherein the smart card is the business transaction card.

26. The computer program product of claim 23, wherein the business transaction card is selected from a credit card, a debit card, a bank card, a cash card, a value card or combinations thereof.

27. The computer program product of claim 23, wherein the wireless device is selected from the group consisting of a mobile telephone, a personal digital assistant and a personal computer.

28. The computer program product of claim 23, wherein the terminal is at a location selected from the group consisting of an ATM machine, a bank, a credit union, a business establishment, a retail establishment and combinations thereof.

29. The computer program product of claim 23, wherein the account information further comprises the identification code, the account identification, paid transactions, an authorized debit card user and an account owner.

30. The computer program product of claim 23, further comprising:
determining instructions for determining if the funds available balance is less than the authorized incremental funds amount; and
determining instructions for determining if an authorization exits to increase the funds available balance.

31. The computer program product of claim 30, wherein the authorization does not exist to increase the funds available balance, the computer program product further comprises:
refusing instructions for refusing to automatically increase the available funds balance; and
sending instructions for sending a message that an increase to the available funds balance was refused, wherein the message is delivered to a device selected from a mobile telephone, a personal computer, a personal digital assistant, a smart card or combinations thereof.

32. The computer program product of claim 23, after the increasing instructions for automatically increasing the funds available balance of the business transaction card, the computer program product further comprises:

sending instructions for sending a message that the available funds balance was increased, wherein the message is delivered to a device selected from a mobile telephone, a personal computer, a personal digital assistant, a smart card or combinations thereof.

33. The computer program product of claim 23, wherein the authorization code and the account identification comprises numbers, letters or combinations thereof.

34. The computer program product of claim 23, wherein the wireless communication operates via a protocol selected from Bluetooth protocol and WiFi protocol.

35. The computer program product of claim 23, wherein the wireless communication operates in a personal area network.

36. The computer program product of claim 23, further comprising:
receiving instructions for receiving the authorized incremental funds amount as an input;
storing instructions for storing the authorized incremental funds amount in a database.

37. The computer program product of claim 23, further comprising:
receiving instructions for receiving limitations for use of the business transaction card, wherein the limitations are selected from geographical use, time period of use, and merchant classification; and
storing instructions for storing the limitations for use of the business transaction card in a database.

38. The computer program product of claim 23, further comprising:
receiving instructions for receiving authorization instructions;
storing instructions for storing the authorization instructions in a database.

39. The computer program product of claim 38, wherein the authorization instructions are selected from the group consisting of a terminal location to receive the wireless communication, a time to receive the wireless communication and combinations thereof.

40. The computer program product of claim 23, further comprising:
encrypting instructions for encrypting the wireless communication.

41. A system, comprising:
means for sensing a wireless device within a proximity to a terminal that supports wireless communication, wherein the proximity is within a wireless communication coverage area of the terminal;
means for establishing wireless communication between the wireless device and the terminal, wherein the terminal is communicatively connected to a server;
means for automatically transferring an identification code from the wireless device to the terminal;
means for sending the identification code from the terminal to the server;
means for matching the identification code with an account identification of a business transaction card;
means for accessing account information stored on the server, wherein the account information is associated with the account identification of the business transaction card and comprises an authorized incremental funds amount and a funds available balance;
means for comparing the authorized incremental funds amount and a funds available balance; and
if authorized, means for automatically increasing the funds available balance by an amount selected from the amount that increases the funds available balance to the authorized incremental funds amount or by the authorized incremental funds amount.

42. The system of claim 41, wherein the wireless device is a smart card.

43. The system of claim 42, wherein the smart card is the business transaction card.

44. The system of claim 41, wherein the wireless device is selected from the group consisting of a mobile telephone, a personal digital assistant and a personal computer.

45. The system of claim 41, wherein the terminal is at a location selected from the group consisting of an ATM machine, a bank, a credit union, a business establishment, a retail establishment and combinations thereof.

46. The system of claim 41, wherein the account information further comprises the identification code, the account identification, paid transactions, an authorized debit card user and an account owner.

47. The system of claim 41, further comprising:
means for determining if the funds available balance is less than the authorized incremental funds amount; and
means for determining if an authorization exits to increase the funds available balance.

48. The system of claim 41, after the step of automatically increasing the available funds balance of the business transaction card, the method further comprises:
means for sending a message that the available funds balance was increased, wherein the message is delivered to a device selected from a mobile telephone, a personal computer, a personal digital assistant, a smart card or combinations thereof.

49. The system of claim 41, wherein the wireless communication operates via Bluetooth protocol.

50. The system of claim 41, wherein the wireless communication operates via WiFi protocol.

51. The system of claim 41, further comprising:
means for receiving the authorized incremental funds amount value as an input;
means for storing the authorized incremental funds amount value in a database.

52. The system of claim 41, further comprising:
means for receiving limitations for use of the business transaction card, wherein the limitations are selected from geographical use, time period of use, and merchant classification; and
means for storing the limitations for use of the business transaction card in a database.

53. The system of claim 41, further comprising:
means for receiving authorization instructions;
means for storing the authorization instructions in a database.

54. The system of claim 53, wherein the authorization instructions are selected from the group consisting of a terminal location to receive the wireless communication, a time to receive the wireless communication and combinations thereof.

* * * * *

Disclaimer

Patent No. 7,039,440 - Herman Rodriguez; Newton James Smith, Jr.; Clifford Jay Spinac, all of Austin, TX. WIRELESS RECHARGEABLE MONEY CARD. Patent dated May 02, 2006. Disclaimer filed Oct. 06, 2006, by the assignee, INTERNATIONAL BUSINESS MACHINES CORPORATION.

Hereby enters this disclaimer to all claims and the entire term of said patent.

(*Official Gazette September 23, 2008*)